United States Patent [19]

Lauterbach

[11] Patent Number: 4,670,533

[45] Date of Patent: Jun. 2, 1987

[54] CURABLE EPOXY RESIN COMPOSITION

[75] Inventor: Horst Lauterbach, Therwil, Switzerland

[73] Assignee: Giba-Geigy Corporation, Ardsley, N.Y.

[21] Appl. No.: 867,164

[22] Filed: May 27, 1986

[30] Foreign Application Priority Data

Jun. 3, 1985 [CH] Switzerland ................. 2337/85

[51] Int. Cl.$^4$ ............................................. C08G 59/60
[52] U.S. Cl. ........................................ 528/94; 525/113; 525/523; 528/120; 528/123; 528/367
[58] Field of Search ............. 528/120, 367, 123, 94; 525/113, 523

[56] References Cited

U.S. PATENT DOCUMENTS

| | | |
|---|---|---|
| 2,713,569 | 7/1955 | Greenlee . |
| 3,386,956 | 6/1968 | Nawakowski et al. .......... 528/120 X |
| 3,397,156 | 8/1968 | Lopez et al. .................... 528/123 X |
| 3,631,150 | 12/1971 | Green ............................. 528/123 |
| 3,717,612 | 2/1973 | Babayan ......................... 528/120 X |
| 3,732,286 | 5/1973 | Son et al. ........................ 528/123 X |
| 3,903,048 | 9/1975 | Lombardi et al. .............. 528/123 X |
| 4,175,173 | 11/1979 | Bagga et al. . |
| 4,246,394 | 1/1981 | Schulde et al. ................. 528/120 X |
| 4,436,890 | 3/1984 | Kaufman ........................ 528/367 X |

FOREIGN PATENT DOCUMENTS 53-90344 8/1978 Japan .

OTHER PUBLICATIONS

Chem. Abst. 90, 205270t (1979).

Primary Examiner—Earl Nielsen
Attorney, Agent, or Firm—Luther A. R. Hall

[57] ABSTRACT

The invention relates to a substantially anhydrous composition containing (a) an epoxy resin,
(b) as hardener for the epoxy resin, the product obtained (i) by finely homogenizing (1) dicyandiamide and (2) urea by grinding (1) and (2) together or dissolving (1) and (2) in a common solvent, or (ii) by melting (1) and (2) together or (iii) by partially reacting (1) and (2) in a common solvent, the weight ratio of (1) and (2) being in the range from 4:1 to 1:4, and, optionally,
(c) a curing accelerator.

The compositions are suitable in particular for the preparation of coatings, preferably as powder coating compositions, and are distinguished by a very good relationship between levelling and reactivity, and the cured coatings have excellent stability to solvents and boiling water as well as excellent mechanical properties.

12 Claims, No Drawings

CURABLE EPOXY RESIN COMPOSITION

CURABLE EPOXY RESIN COMPOSITION

The invention relates to a substantially anhydrous epoxy resin composition containing a hardener for the epoxy resin, which hardener is based on dicyandiamide and urea, and optionally containing a curing accelerator. The invention also relates to a substantially anhydrous mixture of hardeners for epoxy resins, which mixture is based on dicyandiamide and urea and, optionally, a curing accelerator.

The curing of epoxy resins with dicyandiamide in the absence or presence of curing accelerators is known. Japanese Kokai No. 78/90 344 for example describes epoxy resin compositions which contain dicyandiamide as hardener and a mixture of N-aryl-N',N'-dialkylurea and imidazole compounds as accelerator.

U.S. Pat. No. 2,713,569 describes curable epoxy resin compositions containing urea as hardener and, optionally, alkali metal hydroxides or alkali metal phenoxides as curing accelerators. However, in spite of its low price and it negligible toxicity, urea has not proven successful as a hardener for epoxy resins because, even when reliable accelerators are used, it does not react rapidly enough with the epoxy groups and because, e.g. in surface protection, it has not been possible even at very high baking temperatures to produce industrially utilisable films when using urea as hardener.

German Offenlegungsschrift No. 27 43 015 describes a process for curing epoxy resins with cyanamide, in which process an aqueous solution of cyanamide or of a mixture of cyanamide and urea is homogeneously dispersed in the resin, and curing is then effected in the absence or presence of accelerators, in particular tertiary amines. The resin/hardener mixture is used in particular for preparing moulded articles from fibre-reinforced epoxy resins.

The present invention relates to a substantially anhydrous curable composition containing
(a) an epoxy resin,
(b) as hardener for the epoxy resin, the product obtained (i) by finely homogenising (1) dicyandiamide and (2) urea by grinding (1) and (2) together or dissolving (1) and (2) in a common solvent, or (ii) by melting (1) and (2) together or (iii) by partially reacting (1) and (2) in a common solvent, the weight ratio of (1) to (2) being in the range from 4:1 to 1:4, and, optionally
(c) a curing accelerator.

The compositions of the invention are suitable for the preparation of moulded articles in the form of adhesives, cements, sealing compositions, embedding and insulating compositions for the electronics industry or matrix resins, and in particular for application in surface protection. The cured products are distinguished by excellent mechanical properties, in particular by a very good stability to solvents and to boiling water.

A preferred use of the compositions of the invention is as powder coating compositions. When employed as such, they exhibit a particularly good relationship between levelling and reactivity. Compared with known systems, the compositions of the invention are distinguished either by better reactivity when the levelling is equally good, or by better levelling when the reactivity is the same.

The customary epoxy resins suitable for powder coatings can be employed as epoxy resins (a). Such compounds are described for example in German Offenlegungsschrift No. 28 38 841. The subject matter of this publication accordingly falls within the scope of the present invention.

The resins employed preferably have an epoxide content of 0.5 to 12 equivalents per kg. The preferred epoxy resins are solid at room temperature and can, if necessary, be advanced by reaction with e.g. a divalent phenol.

Particularly preferred epoxy resins are those which contain on average more than one epoxy group in the molecule and which are polyglycidyl derivatives of aromatic or aromatic heterocyclic compounds.

Particularly preferred resins are non-advanced or advanced polyglycidyl ethers of 2,2-bis(4'-hydroxyphenyl)propane (bisphenol A), 2,2-bis(3',5'-dibromo-4'-hydroxyphenyl)propane (tetrabromobisphenol A), of bis(4-hydroxyphenyl)methane (bisphenol F), and of novolaks, polyglycidyl derivatives of 4,4'-diaminodiphenylmethane, of 4,4'-diaminodiphenylsulfone, and of 2,4,6-trihydroxy-1,3,5-triazine (cyanuric acid), e.g. triglycidyl isocyanurate. Non-advanced or advanced polyglycidyl ethers of bisphenol A and bisphenol F are most preferred.

A mixture of various epoxy resins may also be employed as component (a).

Suitably, 10 to 100 g, preferably 15 to 60 g, most preferably 20 to 35 g, of the component (b) are employed per epoxide equivalent of the component (a). The weight ratio of dicyandiamide to urea is preferably in the range from 2:1 to 1:3.

The component (b) is prepared for example by melting dicyandiamide and urea together, with stirring and with heating to about 140°-150° C., allowing the resultant clear melt to cool, and grinding the brittle mass thus obtained. The homogenisation of dicyandiamide and urea may also be carried out in an extruder. If desired, dicyandiamide and urea can also be dissolved in a common solvent, e.g. in ethanol or in ethylene glycol monomethyl ether, with or without heating, and if appropriate, partially reacted, and the solvent is then removed in a suitable manner. The residual solid hardener substance is ground again.

The component (b) is preferably prepared by grinding dicyandiamide and urea together.

In order to facilitate the grinding procedure, grinding assistants such as powdered chalk, heavy spar or talcum may be used. The amount of grinding assistant used may be many times greater than the amount of mixture to be ground, e.g. up to twenty times greater. In order to achieve a suitable homogenisation of dicyandiamide and urea in the mixture of hardeners, the grinding procedure is preferably continued until about 95% of the particles have a size of less than 100 μm, preferably less than 40 μm.

Other hardeners known to the skilled person may of course be combined with the above mixture of hardeners. Examples of such known hardeners are aliphatic, cycloaliphatic, aromatic and heterocyclic amines such as bis(4-aminophenyl)methane, aniline/formaldehyde resins, bis(4-aminophenyl)sulfone, propane-1,3-diamine, hexamethylenediamine, diethylenetriamine, triethylenetetramine, 2,2,4-trimethylhexane-1,6-diamine, m-xylylenediamine, bis(4-aminocyclohexyl)methane, 2,2-bis(4-aminocyclohexyl)propane and 3-aminomethyl-3,5,5-trimethylcyclohexylamine (isophoronediamine), polyaminoamides such as those prepared from aliphatic polyamines and dimerised or trimerised fatty acids, polyphenols such as resorcinol, hydroquinone, 2,2-bis(4-hydroxyphenyl)propane (bisphenol A) and phenol/aldehyde resins, polythiols such as those polythiols which are commercially available under the name of 'thiocols', polycarboxylic acids and the anhydrides thereof such as phthalic anhydride, tetrahydrophthalic anhydride, hexahydrophthalic anhydride, hexachloroendomethylenetetrahydrophthalic anhydride, pyromellitic dianhydride, benzophenone-3,3',4,4'-tetracarboxylic dianhydride, the acids of the aforementioned anhydrides, and also isophthalic acid and terephthalic acid. Catalytic hardeners may also be used. Examples of such hardeners are tertiary amines [e.g. 2,4,6-tris(dimethylaminoethyl)phenol], imidazoles or Mannich bases; alkali metal alcoholates (e.g. the sodium alcoholate of 2,4-dihydroxy-3-hydroxymethylpentane), tin salts of alkane acids (e.g. tin octanoate), Friedel-Crafts catalysts such as boron trifluoride and boron trichloride and their complexes and chelates which are obtained by reacting boron trifluoride with e.g. 1,3-diketones.

If convenient, the composition of the invention may also preferably contain a curing accelerator (c). The amount of accelerator to be used is known to the skilled person and depends on the intended use of the composition. Suitably, 0 to 35 parts by weight, preferably 5 to 20, most preferably 8 to 15, of the curing accelerator (c) are used per 100 parts by weight of the component (b). Suitable accelerators are all those substances which catalyse the reaction between epoxides and amines. Examples of such substances are tertiary amines, quaternary ammonium compounds, alkali metal alcoholates, tetramethylguanidine, 2,4,6-trisdimethylaminomethylphenol, imidazole and, in particular, imidazole derivatives, preferably 2-methylimidazole or 2-ethylimidazole. Several accelerators together may also be used.

The accelerator can be added to the composition of the invention at the same time as the components (a) and (b) are being mixed. Preferably, however, the accelerator is added in the form of a master batch in a minor amount of the epoxy resin, or, in particular, in admixture with the component (b). The accelerator can be suitably added to the melt or to the solution of dicyandiamide and urea.

Depending on the nature of the hardener employed, the curing can be effected either at a lower temperature or at a more elevated temperature. If desired, the curing can be effected in two steps by e.g. interrupting the curing procedure or, if a hardener for more elevated temperatures is employed, by allowing the curable mixture to cure partially at a lower temperature. The products thus obtained are fusible and soluble precondensates (B-stage resins) and are suitable e.g. for compression moulding compounds, sintered powders or prepregs.

The curable compositions of the invention may also contain plasticisers such as dibutyl phthalate, dioctyl phthalate or tricresyl phosphate, or additives such as extenders, fillers, reinforcing agents, dyes, flow control agents and mould release agents. Examples of suitable extenders, fillers and reinforcing agents are asbestos, asphalt, bitumen, glass fibres, textile fibres, carbon or boron fibres, mica, argillaceous earth, gypsum, titanium dioxide, chalk, powdered quartz, cellulose, kaolin, ground dolomite, wollastonite, siliceous earth with a large specific surface (available under the trade name of "Aerosil"), argillaceous earth modified with long-chain amines (available under the trade name of "Bentones"), pulverised polyvinyl chloride, polyolefin or aminoplastics, metallic powders such as aluminium or iron powder. Flame retardants such as antimony trioxide may also be added to the curable compositions.

If the compositions of the invention are employed as powder coating compositions, then further additives conventionally employed in the coating industry may be added to said powder coating compositions. Examples of such additives are light stabilisers and, in particular, deaerating agents, levelling agents and/or pigments.

Examples of levelling agents are polyvinyl acetals such as polyvinyl butyral ("Motival" B 30 H ®, manufactured by HOECHST), a polyethylene glycol, polyvinyl pyrrolidone, glycerol, neopentyl glycol, acrylic copolymers such as "Modaflow" ® or "Acrylron" MFP ®, manufactured by MONSANTO and PROTEX respectively, and also "Acronal" 4F ®, manufactured by BASF, and "Uresin" B ®, manufactured by HOECHST, (a carbamic acid resin formed from butylurethane and formaldehyde).

It is preferred to use benzoin as deaerating agent.

The powder coating compositions can be prepared by simply mixing the components, for example in a ball mill. Another possibility of preparing them consists in melting the components together, preferably in an extruder, for example in a Buss Ko-kneader, and then comminuting the cooled melt. The compositions preferably have a particle size in the range from 0.015 to 500 μm, most preferably from 10 to 75 μm.

The invention further relates to the use of the composition of the invention for the preparation of crosslinked products.

To this end, the composition is e.g. applied to the article to be coated and is heated to at least 120° C., preferably to a temperature in the range from 150° to 250° C., in order to cure the resin.

The invention also relates to moulded articles and coatings prepared by curing the composition of the invention.

The invention further relates to a substantially anhydrous mixture of hardeners for epoxy resins, which mixture comprises (b) the product obtained (i) by finely homogenising (1) dicyandiamide and (2) urea by grinding (1) and (2) together or dissolving (1) and (2) in a common solvent, or (ii) by melting (1) and (2) together or (iii) by partially reacting (1) and (2) in a common solvent, the weight ratio of (1) to (2) being in the range from 4:1 to 1:4, and, optionally (c) a curing accelerator.

The following Examples illustrate a number of compositions of the invention and the use and properties of said compositions. In these Examples, the amounts indicated of the individual components are parts by weight.

EXAMPLE 1

Preparation of a mixture of hardeners

The mixtures of hardeners listed in Table 1 are prepared as follows:

1A–1D A 1.2 liter reaction flask equipped with stirrer is charged with all the components. With slow stirring, the batch is then heated to 140°–150° C. by means of a heating bath. The melt is allowed to cool in a thin layer. The resultant brittle mass is ground in a laboratory mill.

1E With stirring, all the components are dissolved at 30°–60° C. in 300 ml of water in a 1 liter reaction flask.

The solvent is then removed in vacuo and the resultant crystals are ground in a laboratory mill.

1F All the components are ground together for 24 hours in a ball mill.

TABLE 1

| Example | 1 A | 1 B | 1 C | 1 D | 1 E | 1 F |
|---|---|---|---|---|---|---|
| dicyandiamide | 48.4 | 50.8 | 27.4 | 48.4 | 44.7 | 21.8 |
| urea | 38.7 | 40.6 | 64.0 | 38.7 | 44.7 | 21.8 |
| 2-methyl-imidazole | 12.9 | 8.6 | 8.6 | — | 10.6 | 5.1 |
| 2-ethylimidazole | — | — | — | 12.9 | — | — |
| Millicarb[(1)] | — | — | — | — | — | 51.3 |
| | 100.0 | 100.0 | 100.0 | 100.0 | 100.0 | 100.0 |

[(1)]Powdered chalk, manufactured by Pluss Staufer (Oftringen, Switzerland), used as grinding assistant.

EXAMPLE 2

Preparation of a powder coating composition

The components indicated in Table 2 are ground together for 15 minutes in a free-falling mixer. The mixture is homogenised at 80°-100° C. in an extruder, cooled and then ground to an average particle size of about 50 μm. The powder is then applied with an elastrostatic spray gun to a purified aluminium sheet and cured for 15 minutes at 150° C., giving a film having a thickness of about 60 μm with the properties indicated in Table 3.

TABLE 2

| Example | 2 A | 2 B | 2 C | 2 D |
|---|---|---|---|---|
| epoxy resin[(1)] | 640 | 640 | 640 | 640 |
| hardener | | | | |
| 1 A | 25.6 | | | |
| 1 B | | 25.6 | | |
| 1 C | | | 25.6 | |
| 1 D | | | | 25.6 |
| benzoin | 1.4 | 1.4 | 1.4 | 1.4 |
| TiO$_2$ | 333 | 333 | 333 | 333 |

[(1)]epoxy resin especially for powder coating compositions, bisphenol A base, epoxide value = 1.55 val/kg
softening point (DIN 51 920) = 89° C. [contains 1% of Uresin B ® (a carbamate resin formed from butylurethane and formaldehyde) and 1% of Acronal 4F ® (low viscous butyl polyacrylate), manufactured by HOECHST and BASF respectively, as levelling agents]

TABLE 3

| Example | 2 A | 2 B | 2 C | 2 D |
|---|---|---|---|---|
| the minimum baking temperature necessary at a baking time of 15 minutes (°C.) | 115 | 125 | 130 | 120 |
| Erichsen ductility test (mm) (DIN 53 156) | >9 | >9 | >9 | >9 |
| impact resistance[(1)] (cm · kg) | >160 | >160 | >160 | >160 |
| levelling | very good | excellent | excellent | excellent |
| boiling water test (6 h) | o.k. | individual small bubbles | o.k. | individual small bubbles[(2)] |
| yellowness index (DIN 6167) after 10 minutes at 170° C. | 2.5 | 1.5 | 3.5 | 2.0 |

[(1)]An object of known weight is dropped from a specific height onto the back of a coated aluminium sheet. The value obtained, height × weight, indicates the greatest impact at which the film still remains intact.
[(2)]Only visible with a magnifying glass

EXAMPLE 3

The following mixture is ground in a 4.5 liter ball mill containing 2.8 kg of porcelain beads (diameter: 1 to 4 cm):

| | |
|---|---|
| 218.5 g | of urea |
| 218.8 g | of dicyandiamide |
| 52.6 g | of 2-methylimidazole |
| 9.8 g | of neopentyl glycol |
| 500.0 g | of Millicarb (powdered chalk) |
| 1000.0 g | |

After grinding has been effected for 15 hours, a fineness of grain of 74%<80 μm is attained.

A powder coating composition consisting of the following ingredients is prepared with this hardener in accordance with the procedure described in Example 2.

| | |
|---|---|
| epoxy resin of Example 2 | 640.0 g |
| hardener | 51.2 g |
| benzoin | 1.4 g |
| TiO$_2$ | 307.4 g |

The resultant film properties are as follows

| | |
|---|---|
| the minimum baking temperature at a baking time of 15 minutes (°C.) | 125 |
| Erichsen ductility test (mm) (DIN 53 156) | >9 |
| impact resistance (cm · kg) | >160 |
| levelling | excellent |
| boiling water test (6 h) | o.k. |
| yellowness index (DIN 6167) after 10 minutes at 170° C. | 2.5 |

What is claimed is:

1. A substantially anhydrous curable composition containing
   (a) an epoxy resin
   (b) as hardener for the epoxy resin, the product obtained (i) by finely homogenising (1) dicyandiamide and (2) urea by grinding (1) and (2) together or dissolving (1) and (2) in a common solvent, or (ii) by melting (1) and (2) together or (iii) by partially reacting (1) and (2) in a common solvent, the weight ratio of (1) to (2) being in the range from 4:1 to 1:4, and, optionally,
   (c) a curing accelerator.

2. A composition according to claim 1, which is a powder coating composition.

3. A composition according to claim 1, wherein the component (a) contains on average more than one epoxy group in the molecule and is a polyglycidyl derivative of an aromatic or of an aromatic heterocyclic compound.

4. A composition according to claim 3, wherein the component (a) is solid at room temperature and is a non-advanced or advanced polyglycidyl ether of 2,2-bis(4'-hydroxyphenyl)propane (bisphenol A) or of bis(4-hydroxyphenyl)methane (bisphenol F).

5. A composition according to claim 1, wherein 10 to 100 g of the component (b) are present per epoxide equivalent of the component (a).

6. A composition according to claim 5, wherein the weight ratio of dicyandiamide to urea of the component (b) is in the range from 2:1 to 1:3.

7. A composition according to claim 1, wherein the component (b) is prepared by grinding dicyandiamide and urea together.

8. A composition according to claim 1, which contains 0 to 35 parts by weight of the curing accelerator (c) per 100 parts by weight of the component (b).

9. A composition according to claim 8, wherein the curing accelerator (c) is an imidazole derivative.

10. A composition according to claim 9, wherein the curing accelerator (c) is 2-methylimidazole or 2-ethylimidazole.

11. A composition according to claim 2, which contains, in addition to the components (a), (b) and (c), a deaerating agent, a levelling agent and/or a pigment.

12. A substantially anhydrous mixture of hardeners for epoxy resins, which mixture comprises
(b) the product obtained (i) by finely homgenising (1) dicyandiamide and (2) urea by grinding (1) and (2) together or dissolving (1) and (2) in a common solvent, or (ii) by melting (1) and (2) together or (iii) by partially reacting (1) and (2) in a common solvent, the weight ratio of (1) to (2) being in the range from 4:1 to 1:4, and, optionally,
(c) a curing accelerator.

* * * * *